United States Patent
Phillips (10) Patent No.: US 6,442,769 B1
(45) Date of Patent: Sep. 3, 2002

(54) MOUNTING RING FOR WATER CLOSET COUPLING

(75) Inventor: Paul E. Phillips, Erie, PA (US)

(73) Assignee: Erie Advanced Manufacturing, Inc., Erie, PA (US)

( * ) Notice: Subject to any disclaimer, the term of this patent is extended or adjusted under 35 U.S.C. 154(b) by 111 days.

(21) Appl. No.: 09/589,943

(22) Filed: Jun. 7, 2000

Related U.S. Application Data (62) Division of application No. 09/004,418, filed on Jan. 8, 1998, now Pat. No. 6,155,606.

(51) Int. Cl.$^7$ .............................................. E03D 11/00
(52) U.S. Cl. ....................................... 4/252.4; 4/252.1
(58) Field of Search ................................ 4/252.1, 252.4, 4/252.5

(56) References Cited

U.S. PATENT DOCUMENTS

| | | |
|---|---|---|
| 556,489 A | 3/1896 | Coburn |
| 572,575 A | 12/1896 | Scott |
| 630,641 A | 8/1899 | Albree |
| 773,734 A | 11/1904 | Griffiths |
| 776,971 A | 12/1904 | Walsh |
| 903,280 A | 11/1908 | Farrell |
| 939,001 A | 11/1909 | Forster |
| 990,646 A | 4/1911 | Fisher |
| 1,019,766 A | 3/1912 | Cronk |
| 1,031,531 A | 7/1912 | Cramer |
| 1,333,368 A | 3/1920 | Auer |
| 1,505,683 A | 8/1924 | Wyatt et al. |
| 1,613,926 A | 1/1927 | Bropson |
| 1,784,667 A | 12/1930 | Gillet |
| 2,082,348 A | 6/1937 | Tarte |
| 2,743,460 A | 5/1956 | Youngstrom et al. |
| 2,911,239 A | 11/1959 | Marzolf, Sr. |
| 3,108,818 A | 10/1963 | Furstenburg |
| 3,140,104 A | 7/1964 | Cosper |
| 3,319,268 A | 5/1967 | Blumenkranz |
| 3,761,114 A | 9/1973 | Blakeley |
| 3,775,780 A | 12/1973 | McEwen |
| 3,967,836 A | 7/1976 | Izzi, Sr. |
| 4,352,652 A | 10/1982 | Barber |
| 4,886,302 A | 12/1989 | Forbes |
| 5,153,947 A | 10/1992 | Markles |
| 5,220,694 A | 6/1993 | Knorovsky |
| 5,246,255 A | 9/1993 | Forbes et al. |
| 5,309,579 A | 5/1994 | Nelson |
| 5,335,849 A | 8/1994 | Forbes |
| 5,492,372 A | 2/1996 | Dranberg |

OTHER PUBLICATIONS

Grabler Mfg. Co. Catalogue, Fifth Issue, TJ 418 G73, pp. 102 and 112, 1936.*

* cited by examiner

Primary Examiner—Robert M. Fetsuga
(74) Attorney, Agent, or Firm—Edward W. Goebel, Jr.; MacDonald, Illig, Jones & Britton LLP (57) ABSTRACT

A replaceable mounting ring is disclosed for use with a water closet coupling which is interposed between a water closet drain and a sewer pipe. The mounting ring fits on a channel in a flange near the inlet end of the water closet coupling. The mounting ring comprises two arcuate members, each having a U-shaped cross section formed by a base and a leg on each side of the base, with the base having a lower surface between the two legs. A corresponding end of each arcuate member has an extension from the lower surface of its base of a size which allows the extension to engage the lower surface of the base of the opposite end of the other arcuate member. These extensions enable the ends of the arcuate members to form a mounting ring having a U-shaped cross section.

12 Claims, 5 Drawing Sheets

MOUNTING RING FOR WATER CLOSET COUPLING

This application is a division of patent application Ser. No. 09/004,418 filed on Jan. 8, 1998 by the present inventor and entitled Mounting Ring for Water Closet Coupling and Method of Installation U.S. Pat. No. 6,155,606.

BACKGROUND OF THE INVENTION

This invention relates to couplings for connecting water closet drains to sewer pipes, and more particularly, it relates to a mounting ring which secures the coupling to a water closet and to an adjacent floor when desired.

In recent years plastic water closet couplings have been used to connect the drains of water closets to sewer pipes. These water closet couplings are normally made out of plastic materials such as PVC and ABS. Generally speaking water closet couplings comprise a connecting pipe which is solvent bonded onto the sewer pipe, an extension toward the water closet forming a flange with a radially extending channel near the inlet end of the coupling and a mounting ring retained within the channel. These water closet couplings are normally sold as a single unit which is referred to as a closet flange.

Figure 1:
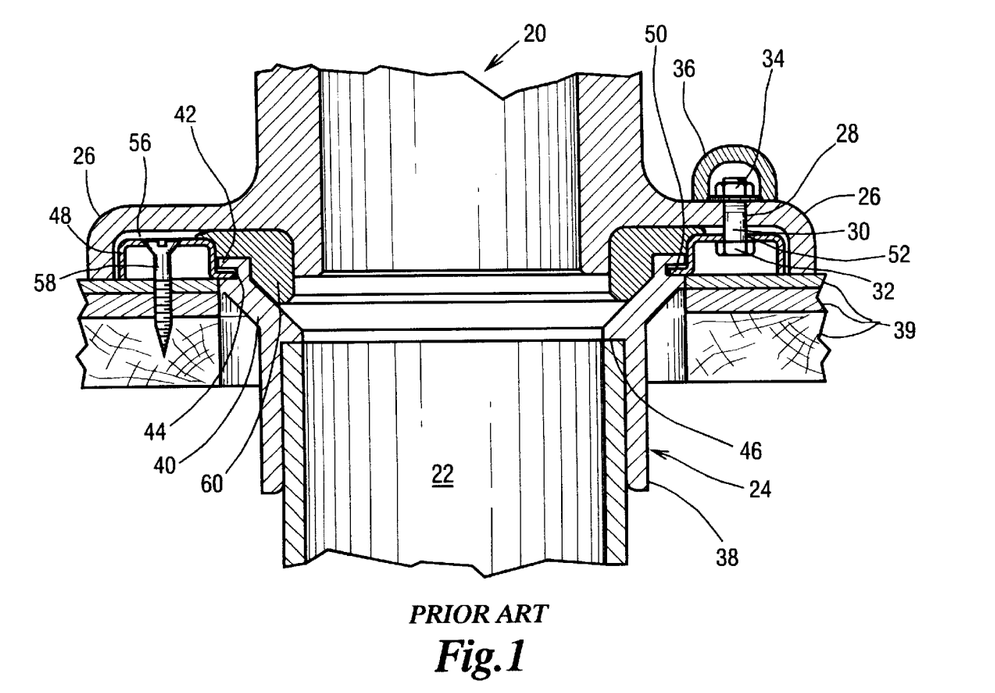
FIG. 1 is a cross-sectional view of a water closet coupling which includes a mounting ring and is installed between a water closet drain and a sewer pipe.

The mounting ring normally has holes in it which enable it to be fastened to the floor, thereby securing the coupling to the floor. The mounting ring also normally has arcuate slots formed within it. After a wax ring is placed about the inlet end of the coupling, the drain of the water closet is set within the coupling so that a base portion of the water closet fits over the mounting ring. The base has holes in it with bolts mounted at positions within the base which enable heads of the bolts to extend through a widened portion of the arcuate slots of the mounting ring. The water closet is rotated slightly to fit the heads of the bolts under the mounting ring. The bolts, when tightened, thus fasten the water closet to the mounting ring and in turn to the floor. Assemblies of this type are shown in U. S. Pat. No. 3,319,268 issued on Mar. 16, 1967 to Blumenkranz and U.S. Pat. No. 3,775,780 issued on Dec. 4, 1973 to McEwen. One such assembly is shown in FIG. 1 and described below.

The load of the water closet is transmitted through the mounting ring. Thus, over a period of time after the installation of a water closet as described above, it is not unusual to find that the mounting ring breaks. This normally occurs in the vicinity of the arcuate slots, where the mounting ring is connected to the water closet. The mounting rings often break due to the stress from the water closet on the mounting ring in the area of the arcuate slots or due to rust or corrosion. As a result, the broken mounting ring has lost its seal and unsanitary liquid leaks from the water closet.

In the past, a number of different methods have been used to repair broken mounting rings. The most common practice has been to disconnect the water closet from the broken mounting ring and the rest of the closet flange and then remove and replace the existing closet flange. Since the existing closet flange has normally been solvent-bonded to the sewer pipe for installation and sanitary purposes, the sewer pipe is often cut at the level where the existing closet flange ends. This is an effort which can be difficult and time-consuming. It sometimes can involve tearing out and replacing portions of the floor beneath the water closet or in some cases even a ceiling below the water closet.

As a result, there have been a number of developments attempting to repair broken mounting rings, rather than replacing them. The patents relating to these developments include U.S. Pat. No. 4,207,630 issued on Jun. 17, 1980 to Bressler which discloses the use of a spanner clamp or flange which extends beneath and support the portion of the mounting ring which has failed. However, since this spanner flange is an extra member which is not an integral portion of the mounting ring, it is subject to potential displacement from the position in which it is mounted. The original problem would then reoccur.

An anchoring device and method for anchoring a toilet to a broken water closet ring are described in U. S. Pat. No. 5,220,694 issued Jun. 22, 1993, to Knorovsky. The anchoring device includes two arcuate members which can be positioned about a broken mounting ring, with their flat surfaces located directly beneath a radial plane of ring. The ends of the radial members are secured together to support the damaged mounting ring. However, the mounting ring can continue to deteriorate until the anchoring device itself can fall off.

Additionally, U.S. Pat. No. 5,492,372 issued on Feb. 20, 1996 to Dranberg, has proposed to replace the original mounting ring with a replacement ring comprising two arcuate pieces. Starting at column 3, line 13, the Dranberg patent contrasts the U-shaped profile of the original mounting ring with two generally flat arcuate pieces it discloses as a replacement.

Figure 2:
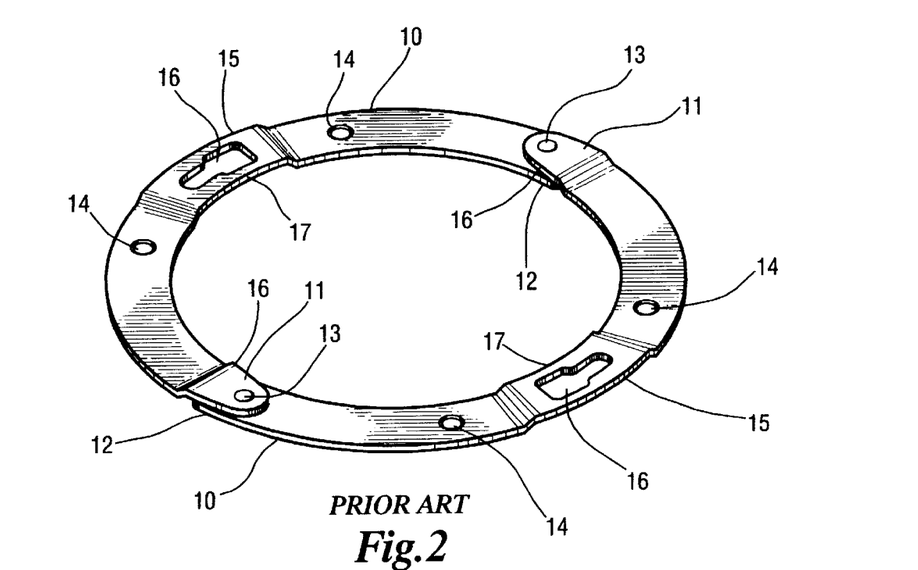
FIG. 2 is a perspective view of a prior art replacement ring.

The replacement ring described in the Dranberg patent is shown in FIG. 2. Each arcuate piece 10 has a stepped-up end 11 which overlaps a flat end 12 of the other piece to enable the pieces 10 to be connected together by fasteners 13. Four holes 14 are included in the arcuate pieces 10 to enable the replacement ring to be fastened to the floor near a water closet. Each arcuate piece 10 also has a stepped-up section 15 having a slot 16 in it to accommodate a bolt or other connection of the replacement ring to a water closet. At these four stepped-up areas the strength of the wax seal placed upon the ring is potentially compromised since there is a discontinuity in the surface of the replacement ring leading to them.

As seen in FIG. 2, inner edges 16 of the stepped-up overlapping ends 11 and inner edges 17 of the stepped up sections 15 are offset from the balance of the arcuate pieces 10 shown in the Dranberg Patent to enable the inner edges of the balance of the arcuate pieces to engage the channel in the closet flange. Thus, while the total circumference of the original mounting ring contacted the channel of the closet flange, a smaller portion of the circumference of the Dranberg patent's replacement ring contacts that channel. This decreases the strength and rigidity of the attachment of the ring to the closet flange. Additionally, by having a flat cross section rather than the U-shaped cross section of the original ring, the replacement ring does not have the additional strength and stability obtained from a channel-shaped cross section.

There is a closet flange currently being manufactured and sold which is molded in total as a single piece of plastic material. That is, that closet flange does not have a separate mounting ring installed on it. Rather, the flange portion of the closet flange is extended radially a distance sufficient to include the arcuate slots required to attach a water closet to it and to include the holes in it to be used to fasten the closet flange to the floor. Thus, if the extended flange portion of this closet flange is broken, it normally cannot be readily repaired because the plastic extended flange is integral with the rest of the closet flange. The replacement ring shown in U.S. Pat. No. 5,492,372 cannot be installed on it.

SUMMARY OF THE INVENTION

This invention relates to a mounting ring which can be used with a water closet coupling interposed between a water closet drain and a sewer pipe, with the coupling having a flange near its inlet end which forms a radially extending channel that can retain the mounting ring. The mounting ring comprises two arcuate members each having a U-shaped cross section formed by a base and a leg on each side of the base. The base has a lower surface between the two legs consisting of a first leg at the inside of the arc of the arcuate members and a second leg at the outside of the arc of the arcuate members. Each arcuate member has a lip extending radially inwardly from the first leg with an inside diameter which allows it to engage the sides of the channel formed by the flange so that each arcuate member can be retained on the water closet coupling.

A corresponding end of each arcuate member has an extension from the lower surface of its base of a size which enables the extension to engage the lower surface of the base of the opposite end of the other arcuate member. These extensions enable the ends of the arcuate members to be fitted together to form a mounting ring having a U-shaped cross section. Fasteners are used to connect each extension to the base of the other arcuate member. Each of the arcuate members has a slot formed within it for connecting a mounting ring to the water closet. Each of the arcuate members also has holes within it for connecting the mounting ring to the floor near the water closet.

In accordance with another aspect of this invention, a plastic mounting ring comprises two plastic arcuate members each having a flat upper profile, a flat lower profile and a predetermined thickness. Each plastic arcuate member has a lip extending radially inwardly with an inside diameter which allows it to engage the sides of the channel formed by the flange on the water closet coupling on which it is to be mounted. A corresponding first end of each arcuate member has a notch of a pre-selected length and a pre-selected height out of the lower level of its thickness. A second corresponding end of each arcuate member has an extension which is coplanar with its flat lower profile. This extension has a thickness equal to the height of the notch and a length no greater than the length of the notch. This enables the extension on the second end of each arcuate member to fit within the notch on the first end of the other arcuate member to form a plastic mounting ring which has a flat upper profile and a flat lower profile.

In accordance with still another aspect of this invention, a flange formation of an installed water closet coupling, which has its installed connecting pipe attached to a sewer pipe, can be replaced without removing the total water closet coupling. The flange formation is cut away from the installed water closet coupling so that no remaining portion of the installed water closet coupling is wider than the installed connecting pipe. In the preferred embodiment of this invention a circular saw is used for this purpose. Additionally, a replacement water closet coupling is provided having a replacement connecting pipe with an inside diameter greater than the outside diameter of the installed connecting pipe to an extent which causes the replacement connecting pipe to fit closely around the installed connecting pipe. The replacement water closet coupling is installed by mounting the replacement connecting pipe around the installed connecting pipe.

This invention does not reside in any one of the features of the mounting rings and method of installing mounting rings which are disclosed above and in the Detailed Description of the Preferred Embodiments and claimed below. Rather, this invention is distinguished from the prior art by its particular combination of features of the mounting ring and method of installing mounting rings which are disclosed. Important features of this invention have been described to illustrate the best mode contemplated to date for carrying out this invention.

Those skilled in the art will realize that this invention is capable of embodiments which are different from those shown in the details of the mounting ring and method of installing mounting rings and can be changed in various manners without departing from the scope of this invention. Accordingly, the drawings and descriptions are to be regarded as illustrative in nature and are not to restrict the scope of this invention. Thus, the claims are to be regarded as including such equivalent mounting rings and methods of installing mounting rings as to not depart from the spirit and scope of this invention.

BRIEF DESCRIPTION OF DRAWINGS

For a more complete understanding and appreciation of this invention and many of its advantages, reference should be made to the following detailed description taken in conjunction with the accompanying drawings therein.

DETAILED DESCRIPTION OF PREFERRED EMBODIMENTS

Referring to the drawings, identical reference numerals and letters designate the same or corresponding parts throughout the several figures shown.

Referring now to the drawings, FIG. 1 shows a typical installation which connects a water closet drain 20 to a sewer pipe 22 using a water closet coupling 24 which is often referred to as a closet flange. The water closet drain 20 includes a base 26 extending around its periphery and having two diametrically opposed bolt holes 28 in it one of which is shown on the right side of FIG. 1. Each of these bolt holes 28 has a bolt 30 which is mounted within it having a head 32 beneath the base 26 and a nut 34 located above the base 26 and beneath a bolt cover 36. The base 26 of the water closet drain 20 is setting on a flooring 39 in the area in which the water closet is being installed.

The water closet coupling comprises a connecting pipe 38 which fits around the sewer pipe 22 and is solvent bonded to it. The water closet coupling 24 further includes a frusto-conically shaped extension 40 which has a flange 42 near its inlet end that forms a radially extending channel 44. The channel 44 extends about the circumference of the flange 42. An internal shoulder 46 is included within the water closet coupling 24 at the area where the coupling 24 is to meet the top of the sewer pipe 22.

The water closet coupling 24 further includes a mounting ring 48 having U-shaped cross section which extends continuously about the flange 42. It is this mounting ring 48 which maintains the water closet coupling 24 in the position in which it is mounted. The mounting ring 22 has a lip 50 extending radially inwardly with an inside diameter which allows it to engage the sides of the channel 44 formed by the flange 42 while being able to rotate within the channel 44. This lip 50 extends about the circumference of the mounting ring 48 so that it engages the total circumference of the channel 44. A mounting ring of this type is shown in U.S. Pat. No. 3,319,268.

The mounting ring 48 has a pair of arcuate slots 52 formed within it. The arcuate slots 52 are similar to the arcuate slots in many of the mounting rings used with the water closets manufactured in recent years, including the slot 16 in the prior art replacement ring shown in FIG. 2. The arcuate slots 52 are also included in the mounting rings of this invention shown in FIGS. 3 and 4. Each of the slots typically has an expanded end 54 which enables the head 32 of the bolt 30 to extend within the U-shaped profile of the mounting ring. The mounting ring 48 also includes a number of holes 56 about its circumference, one of which is shown in the left side of FIG. 1. These holes are normally countersunk so as to accommodate the matching heads of screws, such as the screw 58, inserted in them and screwed directly into the floor 38 to attach the mounting ring 48 to the floor.

A wax ring 60 is placed on the inlet end of the closet flange 24 to form a seal between the water closet drain 20 and the closet flange 24, including the frusto-conically shaped extension 40, the flange 42 and the mounting ring 48.

Closet flanges such as the closet flange 24 are normally obtained in an assembled condition prior to installation with the mounting ring 48 rotatably mounted within the channel 44 of the flange 42. Bonding solvent is coated on the inside surface of the connecting pipe 38, and then the connecting pipe 38 is installed around the sewer pipe 22 so that the top of the sewer pipe 22 contacts the internal shoulder 46. The slots 52 are located in the proper position for mounting the water closet. The screws 58 are then inserted through the holes 56 in the mounting ring 48 and twisted into the flooring 38. The wax ring 60 is placed around the top of the flange 42 to create a seal between the water closet drain 20 and the water closet coupling 24, including the mounting ring 48. The water closet drain 20 is then placed on the wax ring 60 and the closet flange 24 so that the head 32 of each of the two bolts 30 passes through the expanded areas 54 of the slots 52 and into the slots 52. The nut 34 on each of the bolts 30 is tightened so that the base 26 of the water closet drain 20, and thus the water closet itself, is firmly attached to the mounting ring.

Figure 3:
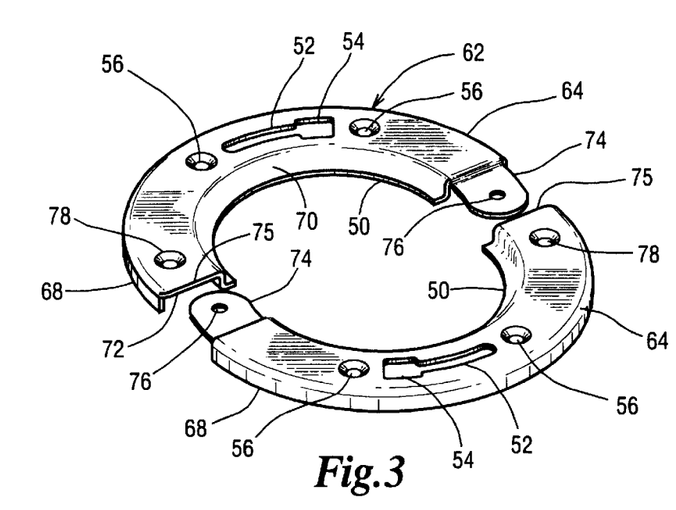
FIG. 3 is a perspective view of two arcuate members of a mounting ring in accordance with one embodiment of this invention.
Figure 4:
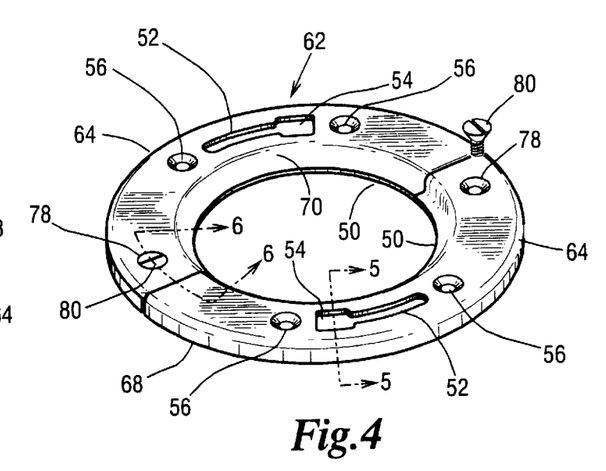
FIG. 4 is a perspective view of an assembled mounting ring of this invention using the two arcuate members shown in FIG. 3

In accordance with this invention, a mounting ring 62 is provided, as shown in FIGS. 3 and 4, having a structure which allows it to be substituted for the mounting ring 48 shown in FIG. 1. The mounting ring 62 retains many of the features of the mounting ring 48. Thus, the mounting ring 62 of this invention is desirable for use both as an original mounting ring and as a replacement for damaged mounting rings on water closet couplings. The mounting ring 62 has a structure which allows it to be easily installed on a water closet flange while maintaining a flat upper surface and a structurally sound U-shaped profile.

Figure 5:
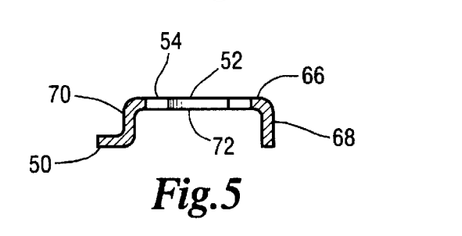
FIG. 5 is a cross-sectional view of the mounting ring shown in FIG. 4, taken along the line 5—5.

The mounting ring 62 comprises two arcuate members 64 which can be identical in structure. Each arcuate member 64 has a U-shaped cross section, shown in FIG. 5, consisting of a base 66, an outer leg 68 at the outside of the arc and an inner leg 70 on the inside of the arc. The arcuate members 64 each have a lip 50 extending radially inwardly from the inner leg 70 which is identical to the lip 50 of the mounting ring 48 shown in FIG. 1. The base 66 has a lower surface 72 located between the outer leg 68 and the inner leg 70.

A corresponding end of each arcuate member 64 has an extension 74 from the lower surface 72 of the base 66. This extension 74 is narrower than the width of the lower surface 72 between the legs 68 and 70 on each side of the U-shaped cross section. Thus, the extensions 74 can each engage the lower surface 72 of the base 66 of the opposite end 75 of the other arcuate member. See FIG. 6 by way of example. This enables the arcuate members 64 to be assembled into a mounting ring 62. The resulting mounting ring 62 has a continuous upper surface forming the base 66 and a continuous inside surface forming the inside leg 70 and the lip 50. It is important to the functioning of the mounting ring to keep upper surfaces of the base and the surface of inside leg 70 as continuous as possible since they form the seat of the wax ring 60 during installation. See FIG. 1. These continuous surfaces minimize any potential for a leak to occur between the wax seal 60 and a replacement ring.

Each of the extensions 74 has a hole 76 in it, while the opposite end of each arcuate member 64 has a corresponding, countersunk hole 78. The holes 78 and 76 allow a fastener 80 to be placed in them to join the arcuate members 64. FIG. 4 shows bolts 80 which can be placed into the holes 78 and 76 to fasten the arcuate pieces 64 together to form the mounting ring 62.

Figure 6:
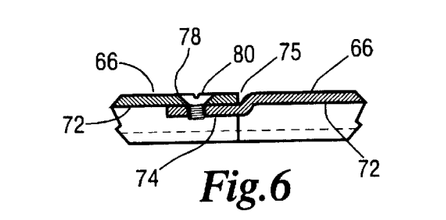
FIG. 6 is a cross-sectional view of the mounting ring shown in FIG. 4, taken along the line 6—6.

FIG. 6 is a cross-sectional view of the ends of the arcuate pieces 64 shown in FIG. 4, taken along the line 6—6. It shows one of many possible arrangements for fastening extension 74 of one arcuate member 64 to end 75 of the other. In FIG. 6 threads are cut within the hole 76, and the bolt 80 is screwed into those threads.

Figure 7:
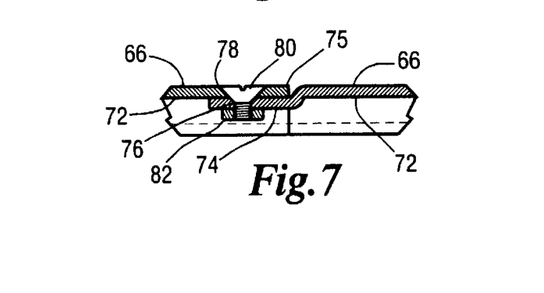
FIG. 7 is a cross-sectional view of an alternate fastening arrangement for arcuate members of the mounting ring.

FIG. 7 shows another arrangement for fastening together the ends of the arcuate members 64. A nut 82 is welded or otherwise attached to the lower surface 72 beneath the hole 76. The hole 76 is partially countersunk to accommodate the bolt 80. The bolt 80 can then be screwed into the nut 82 to fasten the extension 74 of one arcuate member 64 to the end 75 of the other.

Figure 8:
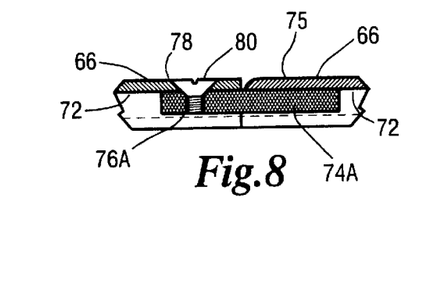
FIG. 8 is a cross-sectional view of an alternate extension for one end of the arcuate members of the mounting ring.

FIG. 8 shows another embodiment of this invention in which an extension 74A comprises material which is different from that of the base 66 and the arcuate members 64. The extension 74A is itself fastened to the lower surface 72 of the base 66. The extension 74A could be fastened to the base 66 through welding or through the use of a bolt or screw or any other convenient fastening method or mechanism. As shown in FIG. 8, the material 74A forming the extension includes a hole 76A which is partially countersunk to accommodate the head of the bolt 80. The hole 76A is also tapped so that the bolt 80 can be screwed into it.

The mounting ring 62 can be made of stainless steel or powder coated galvanized steel or aluminum or any other type of metal or plastic which can withstand the forces transmitted from an attached water closet and can withstand potential continued dampness caused by liquid draining from a water closet drain. Stainless steel or aluminum bolts or screws, or any other type of bolt or screw or fastener found to be effective in a potentially damp environment, can be used to hold the arcuate members 64 together as a continuous mounting ring 62. The U-shaped portion of each arcuate member is preferably semi-circular in shape, allowing them to be mass produced from one type of tooling and readily packaged. However, it would be possible to make one of the arcuate members larger than a semi-circle and correspondingly smaller if desired.

Figure 9:
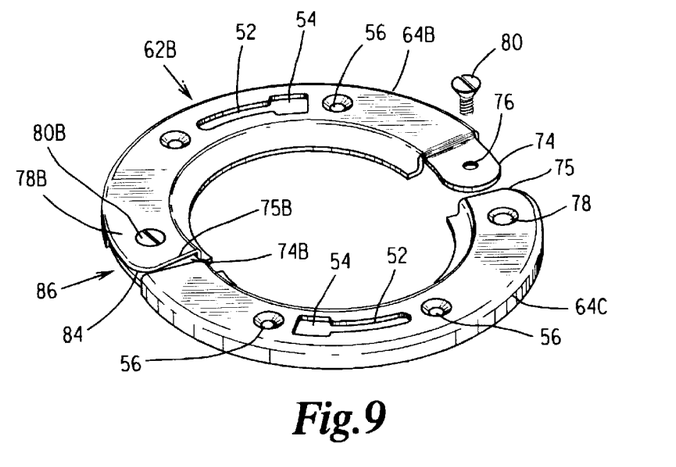
FIG. 9 is a perspective view of a mounting ring in accordance with another aspect of the invention.
Figure 10:
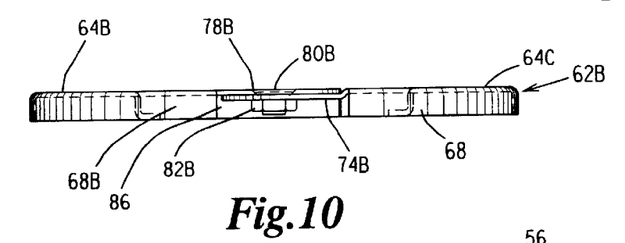
FIG. 10 is a side view of the mounting ring shown in FIG. 9
Figure 11:
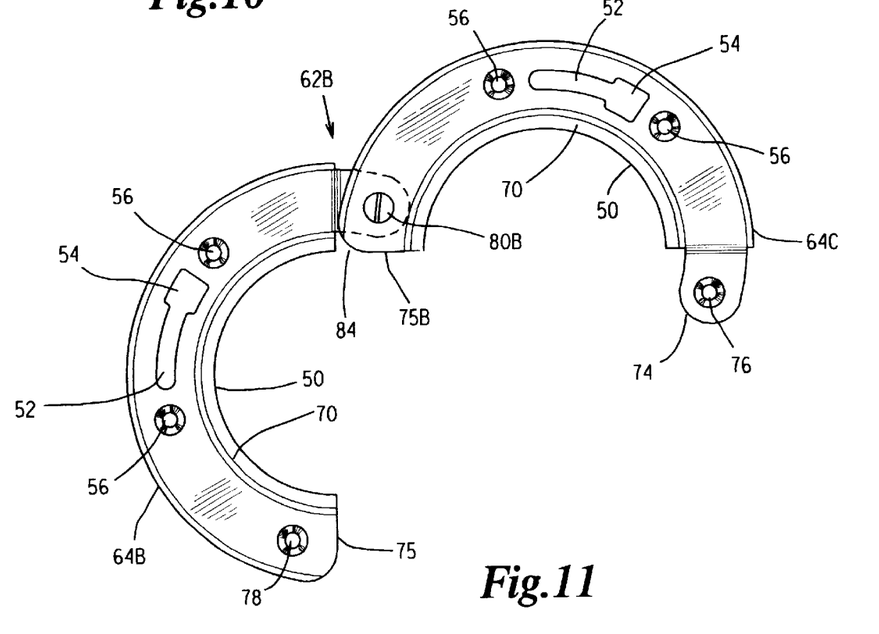
FIG. 11 shows pivoted arcuate members of the mounting ring shown in FIG. 9.

FIGS. 9–11 show another embodiment of this invention wherein arcuate members 64B and 64C are connected to one another by a pivot joint to form the mounting ring 62B. The pivot joint consists of extension 74B at one end of arcuate member 64B, a hole 78B in an end 75B of arcuate member 64C as well as a bolt 80B and a nut 82B, shown in FIG. 10. The bolt 80B passes through a hole 78B in the arcuate member 74B and through a hole 76B in extension 74B to join the arcuate members 64B and 64C. Material has been removed from the outside leg 68B of arcuate member 64C. As a result, an opening 86 is formed in the outside leg 68B at the end 75B of the arcuate member 64C. Additionally, material must be removed from outside corner 84 at the end 75B of the arcuate member 64C to allow the corner 84 to rotate past the end 75 of the arcuate member 64B.

As shown in FIGS. 10 and 11, the opening 86 and the rounded corner 84 allow the extension 74B of arcuate member 64B to pivot within the U-shaped structure of arcuate member 64C. Thus the arcuate members 64B and 64C can be rotated away from one another and then toward one another as the mounting ring 62B is installed on a water closet coupling.

The ends of the arcuate members 64B and 64C opposite the pivot joint can be constructed in the same manner as the ends forming the pivot joint are constructed. This enables the arcuate members to be mass produced and assembled using one design and one set of tooling. Alternatively, the ends of the arcuate members opposite the pivot joint could be constructed in a manner similar to the ends shown in FIGS. 3–8, as long as the open ends of the assembly can be joined together during installation of the mounting ring 62B. The balance of the structure of the mounting ring 62B can be the same as is shown in FIGS. 3 and 4 and has been numbered similarly.

As a result of the use of the pivot joint between the arcuate members 64B and 64C, the mounting member 62B is assembled in one piece before it is installed on a water closet coupling. Thus, the mounting ring 62B can be held in one hand by a plumber or other person installing it, while the other hand fits inner lip 50 of the mounting ring 62B within the channel formed by the flange near the inlet end of the water closet coupling. See the channel 44 and the flange 42 of the water closet coupling 24 shown in FIG. 1. The ends of the arcuate members 64B and 64C opposite the pivot joint are then secured together with an appropriate fastener.

FIGS. 9–11 show one structure of a pivot joint in accordance with a preferred embodiment of this invention. Those skilled in the art will recognize that pivot joints can be constructed in a number of different forms.

Figure 12:
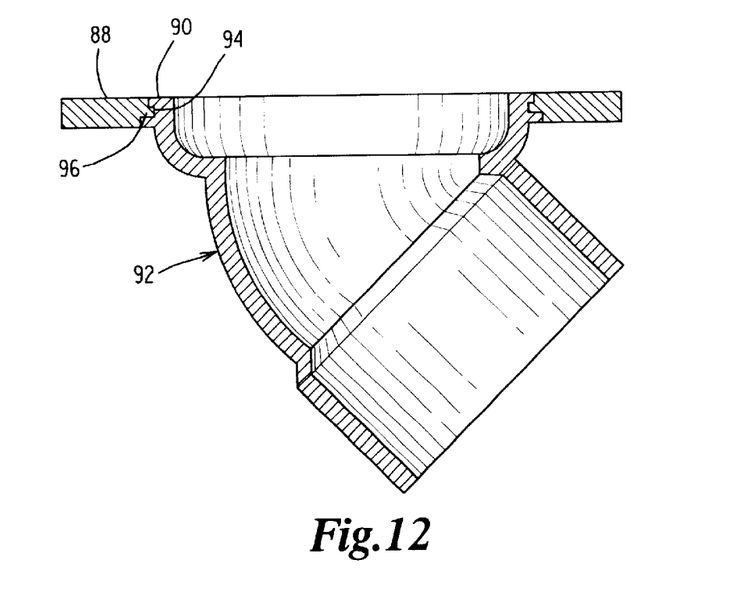
FIG. 12 is a cross-sectional view of a water closet coupling having a solid plastic mounting ring.

There are some water closet couplings on the market which use plastic mounting rings. One type of plastic mounting ring being used is a flat mounting ring 88 shown in FIG. 12. The mounting ring 88 is separate from a flange 90 of a water closet coupling 92 and has a lip 96 located at its inside diameter. The flange 90 forms a channel 94 which is engaged by the lip 96. The sizes of the lip 96 and the inside diameter of the mounting ring 88 normally allow the mounting ring 88 to be rotated about the flange 90 so as to properly locate arcuate slots (not shown in FIG. 12) in the proper position for mounting a water closet.

Figure 13:
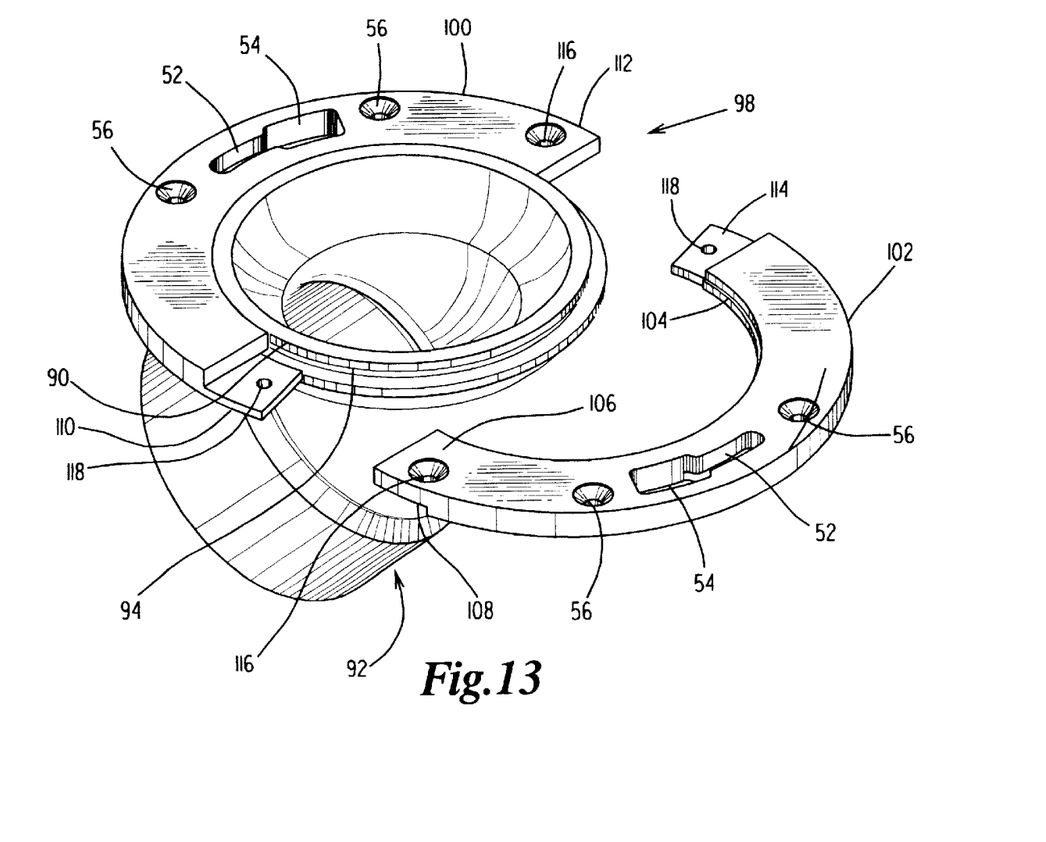
FIG. 13 is a partially exploded, perspective view of a solid plastic mounting ring in accordance with another aspect of this invention, installed as part of a water closet coupling.

In accordance with this invention, and as shown in FIG. 13, mounting ring 98 is provided which comprises a pair of arcuate members 100 and 102. The arcuate members 100 and 102 also have a lip 104 which is located on their inside diameter. The lip 104 engages a channel 94 formed by the flange 90 so as to support the mounting ring 98 on the closet coupling 92. As shown in FIG. 13 the mounting ring 98 has slots 52 with expanded areas 54 for mounting a water closet drain. The mounting ring 98 also has holes 56 for screws to fasten the ring 98 to a floor where a water closet is to be installed. These slots 52, expanded areas 54 and holes 56 can be the same as those used in any other mounting ring.

In further accordance with this invention the arcuate members 100 and 102 form lap joints with one another at the two areas where they meet. The arcuate members 100 and 102 are made of plastic material having a flat upper profile and a flat lower profile. An end 106 of arcuate member 102 has a notch 108 out of the lower level of its thickness. The notch 108 has a predetermined length and a predetermined height. An extension 110 from one end of the arcuate member 100 has a thickness substantially equal to the height of the notch 108 and has a length no greater than the length of the notch 108. This allows the extension 110 to fit within the notch 108, forming a lap joint which maintains the flat upper and lower profiles of the mounting ring. The opposite end 112 of the arcuate member 100 also has a notch (not shown) out of the lower level of its thickness which is identical to notch 108. Similarly, arcuate member 102 has an extension 114 identical to extension 110 located at its end which is opposite from notched end 106. The extension 114 fits into the notch (not shown) in the end 112 to maintain the flat upper and lower profiles of the mounting ring when it is assembled.

Each of the ends 106 and 112 has a hole 116 of sufficient size to receive a bolt or a screw or other fastener used to connect these ends to the extensions 110 and 112, respectively. Similarly, each of the extensions 110 and 114 has a hole 118 in it to receive the fastener through the holes 116. The holes 118 can be tapped, if desired, to retain the threads of a bolt or a screw. Any other arrangement known to those skilled in the art can be used to cause fasteners to hold the lap joints together. It is preferable to removably fasten the ends 106 and 112 to the extensions 110 and 114, respectively, to complete the lap joints which form the mounting ring. However, if desired, the lap joints can be formed by bonding the ends 106 and 112 to the extensions 110 and 114, respectively.

The resulting mounting ring 98 can be easily assembled and installed in the plastic water closet flange 92 initially before the water closet flange 92 itself is installed between a water closet drain and a sewer pipe. The mounting ring 98 can also be installed on the water closet flange 92 as a replacement for a mounting ring which was initially included on the water closet flange. In either event the assembled mounting ring 98 will have not only a structure which allows it to be easily assembled on a water closet coupling, but also a flat profile which allows the ring 98 to form a consistent seal between itself and a wax seal installed between it and a water closet drain.

Alternatively, the arcuate members 100 and 102 could be joined together by making one of the lap joints into a pivot joint. By way of example the outside corner of the end 106 and the outside corner of the extension 110 could be rounded or otherwise cut away. The amount of the material removed from these corners would be sufficient to allow the arcuate members 100 and 102 to pivot away from one another and then toward one another after the end 106 has been attached to extension 100 by a fastener through holes 116 and 118. The plastic mounting ring 98 could then be used in the same manner as the mounting ring 62B shown in FIGS. 9–11.

There are water closet couplings on the market that are one solid piece of plastic. The mounting ring used for this type of water closet coupling is molded onto the inlet end of the coupling and cannot be rotated except by rotating the water closet coupling it self before it is bonded onto a sewer pipe.

Figures 14A, 14B, 14C, 14D, 14E:
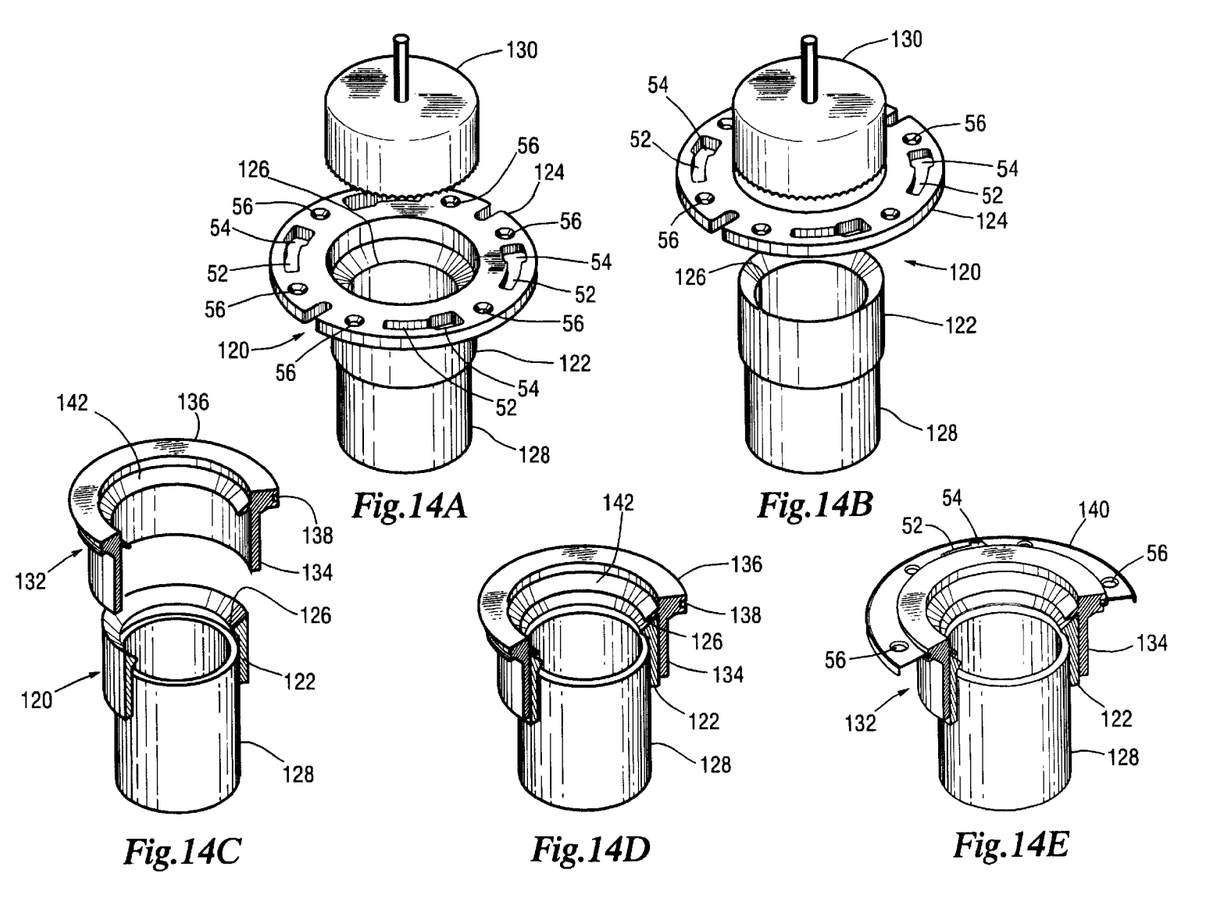
FIGS. 14A–14E illustrate a method of installing a replacement water closet coupling.

A water closet coupling of this type comprises an installed water closet coupling 120 shown in FIG. 14A. The installed water closet coupling 120 includes a connecting pipe 122 and a flange formation 124 which is integral with the connecting pipe 122. The installed water closet coupling 120 also includes an internal shoulder 126 which is shown more clearly in FIG. 14C.

The flange formation 124 can have the same type of holes 56 used in separable mounting rings for attaching the water closet coupling 120 to flooring in the area where a water closet is to be installed. It can also have slots 52 and expanded areas 54 of the type used in other mounting rings to receive bolts from a water closet. The connecting pipe 122 of the water closet coupling 120 is shown installed on a sewer pipe 128.

As indicated above, the fact that the flange formation 124 is molded as part of the water closet coupling 120 makes the flange formation 124 difficult to repair if it cracks once the water closet coupling 120 is installed on the sewer pipe 128. Prior to this invention there was no alternative to cutting off the water closet coupling 120 of the section of the sewer pipe 128 on which it was installed and installing a new water closet flange on the sewer pipe. This often resulted in a significant amount of work and cost.

A method of replacing a flange formation of an installed water closet coupling is shown in FIGS. 14A–14E. The first act of this method involves cutting the flange formation 124 away from the installed water closet coupling 120 so that no portion of the installed water closet coupling 120 is larger than the installed connecting pipe 122. In the preferred embodiment of this invention, the flange formation is cut through the use of a circular saw 130 which can fit within the inside diameter of the flange formation 124. The flange formation 124 is then cut from the top of the installed connecting pipe 122 as shown in FIG. 14B. The objective is to remove the flange formation 124 in such a way that no remaining portion of the installed water closet coupling 120 is wider than the installed connecting pipe 122. Where plastic material extends outside the installed connecting pipe 122 after the flange formation 124 has been removed, a file or other appropriate tool may have to be used to remove the excess plastic material.

Next, a replacement water closet coupling 132 must be provided which has a replacement connecting pipe 134 with an inside diameter greater than the outside diameter of the installed connecting pipe 122. See FIGS. 14C and 14D. The inside diameter of the replacement connecting pipe 134 should be slightly greater than the outside diameter of the connecting pipe 122 so that the replacement connecting pipe 134 fits closely around the installed connecting pipe 122.

The replacement water closet coupling 132 can be of any design which is desired by those skilled in the art. The replacement water closet coupling 132 shown in FIG. 14C has a flange 136 about the circumference of its inlet end. The flange 136 forms a slot 138 which extends around the full circumference of the replacement water closet coupling 132. A mounting ring of any convenient design could be included in the slot 138. See mounting ring 140 shown in FIG. 14E by way of example. The replacement water closet coupling 132 can also have an internal shoulder 142 which can rest on the top of the remaining portion of the installed water closet coupling 120, formed about its internal circumference.

The replacement water closet coupling 132 is installed over the water closet coupling 120 by installing a replacement connecting pipe 132 around the installed connecting pipe 122. See FIGS. 14D and 14E. Normally, bonding material such as PVC Cement, manufactured by Oatey, 4700 W. 160 St., Cleveland, Ohio 44135, would be painted on either the inside surface of the replacement connecting pipe 134 or on the outside surface of the installed connecting pipe 122. This would then bond the replacement water closet coupling 132 to the installed water closet coupling 120.

If a mounting ring made in accordance with this invention such as the mounting ring 62 shown in FIG. 3, was used as the mounting ring 140, it could be added to the replacement water closet coupling 132 before the installation or at the end of the installation of this coupling as shown in FIG. 14E.

The method of the invention can also be used, if desired, to remove from a water closet coupling a flange of the type which has a mounting ring on it.

Those skilled in the art will recognize that many modifications can be made to this invention without departing from its spirit and scope. Thus, the appended claims are intended to be interpreted to cover such equivalents which do not depart from the spirit and scope of this invention.

What is claimed is:

1. A mounting ring for use with a water closet coupling which can be interposed between a water closet drain and a sewer pipe, the coupling having a flange near its inlet end which forms a radially extending channel that retains said mounting ring, said mounting ring comprising:

(a) two arcuate members each having a U-shaped cross section formed by a base and a first leg and a second leg; said first leg located on the inside of the arc of each arcuate member and said second leg located on the outside of the arc of each arcuate member, and said base having a lower inside surface between said legs; said first leg of each arcuate member having a lip extending radially inwardly with an inside diameter which allows said lip to engage the sides of the channel formed by the flange so that each arcuate member can be retained on the coupling, a corresponding end of each arcuate member having an extension from the lower inside surface of said base of each arcuate member of a size which enables said extension to engage said lower inside surface of said base of the end opposite said corresponding end of the other arcuate member to enable said arcuate members to be fitted together to form said mounting ring;

(b) each of said arcuate members having a slot for connecting said mounting ring to the water closet, and (c) each of said arcuate members having holes for connecting said mounting ring to a floor.

2. The mounting ring according to claim 1 which includes fasteners that connect each extension to the base of the other arcuate member.

3. The mounting ring according to claim 1 in which said lip extends substantially around the total circumference of said ring when said ring is assembled.

4. The mounting ring according to claim 1 in which each arcuate member forms a semicircle.

5. The mounting ring according to claim 1 in which said extension from the lower surface of said base of each arcuate member is formed from an extension of the material of said base.

6. The mounting ring according to claim 1 in which said extension from the lower surface of said base of each arcuate member is attached to the lower surface of said corresponding end of each arcuate member.

7. The mounting ring according to claim 1 in which said extension from said lower surface of said base of each arcuate member is a piece of material which is separate from material comprising said arcuate members, and said mounting ring includes removable fasteners, said removable fasteners connecting each extension to at least the base of the other arcuate member.

8. The mounting ring according to claim 7 in which said removable fasteners comprise fasteners having screw threads.

9. The mounting ring according to claim 1 in which said extension from said lower surface of said base of each arcuate member is a piece of material which is separate from material comprising said arcuate members, and said mounting ring includes removable fasteners, said removable fasteners connecting each extension to be the base of both arcuate members.

10. The mounting ring according to claim 9 in which said removable fasteners comprise fasteners having screw threads.

11. A metal mounting ring for use with a water closet coupling which can be interposed between a water closet drain and a sewer pipe, the coupling having a flange near its inlet and which forms a radially extending channel that retains said mounting ring, said mounting ring comprising:

(a) two arcuate metal members each having a U-shaped cross section formed by a base and a first leg and a second leg; said first leg located on the inside of the arc of each arcuate member and said second leg located on the outside of the arc of each arcuate member, and said base having a lower inside surface between said legs; said first leg of each arcuate member having a lip extending radially inwardly with an inside diameter which allows said lip to engage the sides of the channel formed by the flange so that each arcuate member can be retained on the coupling, (b) a pair of pieces of metal, each piece of metal having a width which enables it to contact the lower inside surface of said base between said legs of said arcuate metal members and a length which enables each piece of metal to extend across the ends of said two arcuate members when they are assembled into said mounting ring and to be fastened to each arcuate member;

(c) fasteners having screw threads, said fasteners having screw threads connecting at least one of said pieces of metal to the base of at least one arcuate member;

(d) each of said arcuate members having a slot for connecting said mounting ring to the water closet; and (e) each of said arcuate members having holes for connecting said mounting ring to a floor.

12. The metal mounting ring according to claim 11 which includes additional fasteners having screw threads for connecting each piece of metal to the base of both arcuate members.

* * * * *